(12) United States Patent
Yang

(10) Patent No.: US 11,601,378 B2
(45) Date of Patent: Mar. 7, 2023

(54) METHOD AND APPARATUS FOR ALLOCATING SERVER RESOURCE, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventor: Tao Yang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/214,763

(22) Filed: Mar. 26, 2021

(65) Prior Publication Data

US 2021/0218690 A1 Jul. 15, 2021

(30) Foreign Application Priority Data

Jul. 20, 2020 (CN) .......................... 202010699605.X

(51) Int. Cl.
*H04L 47/78* (2022.01)
*H04L 47/762* (2022.01)
(Continued)

(52) U.S. Cl.
CPC .............. *H04L 47/781* (2013.01); *G06F 9/50* (2013.01); *H04L 47/762* (2013.01); *H04L 47/805* (2013.01); *H04L 47/808* (2013.01)

(58) Field of Classification Search
CPC ... H04L 47/781; H04L 47/762; H04L 47/805; H04L 47/808; G06F 9/50
See application file for complete search history.

(56) References Cited

U.S. PATENT DOCUMENTS 8,694,400 B1 * 4/2014 Certain ................. G06Q 30/08
705/35
10,152,449 B1 * 12/2018 Ward, Jr. .................. G06F 9/50
(Continued)

FOREIGN PATENT DOCUMENTS

JP 2002-374290 A 12/2002
JP 2016-536721 A 11/2016
(Continued)

OTHER PUBLICATIONS

European Patent Application 21165654.1 extended European search report dated Sep. 22, 2021, 10 pages.

*Primary Examiner* — Glenton B Burgess
*Assistant Examiner* — Jihad K Boustany
(74) *Attorney, Agent, or Firm* — Lathrop GPM LLP

(57) ABSTRACT

Embodiments of the present disclosure disclose a method and apparatus for allocating a server resource, an electronic device and a computer readable storage medium, and relate to the technical fields of cloud platform, cloud environment, containerization and resource allocation. A specific implementation of the method comprises: acquiring a container group creation request initiated by a user for creating a target container group; determining a required amount of server resources required by the user and a remaining amount of the server resources according to the container group creation request, the remaining amount comprising at least one of an exclusive server resource or a shared server resource; rating qualities of the remaining amount of server resources in the remaining amount, and selecting a target server resource corresponding to the required amount according to an obtained actual rating; and allocating the target server resource to the user for creating the target container group.

17 Claims, 4 Drawing Sheets

(51) Int. Cl.
*H04L 47/80* (2022.01)
*G06F 9/50* (2006.01)

(56) References Cited

U.S. PATENT DOCUMENTS

| | | | |
|---|---|---|---|
| 2011/0173637 A1* | 7/2011 | Brandwine | G06Q 20/085 |
| | | | 719/314 |
| 2016/0043968 A1 | 2/2016 | Jacob et al. | |
| 2019/0108168 A1* | 4/2019 | Burns | H04L 67/52 |
| 2021/0174281 A1* | 6/2021 | Bhaskara | G06Q 10/06315 |
| 2021/0216346 A1* | 7/2021 | Mahanta | G06F 9/3891 |

FOREIGN PATENT DOCUMENTS

| | | |
|---|---|---|
| JP | 2019-117485 A | 7/2019 |
| JP | 2019-149129 A | 9/2019 |
| WO | WO2016/110950 A | 7/2016 |
| WO | WO2020/000944 A | 1/2020 |

* cited by examiner

METHOD AND APPARATUS FOR
ALLOCATING SERVER RESOURCE,
ELECTRONIC DEVICE AND STORAGE
MEDIUM

CROSS-REFERENCE TO RELATED
APPLICATIONS

This application claims priority to Chinese Patent Application No. 202010699605.X, filed with the China National Intellectual Property Administration (CNIPA) on Jul. 20, 2020, the contents of which are incorporated herein by reference in their entirety.

TECHNICAL FIELD

The present disclosure relates to the technical field of resource scheduling, particularly to the technical fields of cloud platform, cloud environment, containerization and resource allocation, and more particularly to a method and apparatus for allocating a server resource, an electronic device and a computer readable storage medium.

BACKGROUND

In a usage scenario of a Kubernetes (an application for managing containerization across a plurality of hosts in a cloud platform), there is generally a need for a plurality of tenants (i.e., a plurality of user groups) to be separated from each other for use. In this situation, a tenant may only see and apply for its own resource, but different tenants may share the same physical server.

The Kubernetes may support the plurality of tenants through a Namespace mechanism, and provide a support to share a physical server between the tenants. However, in practice, the following technical problems would occur. The tenants share a resource on the same physical server, resulting in a mutual influence, and thus, the need for a core business to run exclusively may not be supported. Moreover, the tenants compete for the resource when applying for the resource. In an extreme situation where a single tenant applies for all resources, other tenants may not run a task.

The existing technology provides an implementation scheme in which a fully separated server resource is provided for each tenant, a different small cluster is respectively created for the each tenant, and a different server resource is pre-allocated to each small cluster, thereby preventing the preemption.

SUMMARY

Embodiments of the present disclosure provide a method and apparatus for allocating a server resource, an electronic device and a computer-readable medium.

In a first aspect, embodiments of the present disclosure provide a method for allocating a server resource, comprising: acquiring a container group creation request initiated by a user for creating a target container group; determining a required amount of server resources required by the user and a remaining amount of server resources according to the container group creation request, the remaining amount comprising at least one of an exclusive server resource or a shared server resource; rating qualities of the remaining amount of server resources, and selecting a target server resource corresponding to the amount according to an obtained actual rating; and allocating the target server resource to the user for creating the target container group.

In a second aspect, embodiments of the present disclosure provide an apparatus for allocating a server resource, comprising: a creation request acquiring unit, configured to acquire a container group creation request initiated by a user for creating a target container group; an amount and remaining amount determining unit, configured to determine a required amount of server resources required by the user and a remaining amount of server resources of the user according to the container group creation request, the remaining amount comprising at least one of an exclusive server resource or a shared server resource; a quality rating and selecting unit, configured to rate qualities of the intra-city server resources, and select a target server resource corresponding to the required amount according to an obtained actual rating; and a resource allocating unit, configured to allocate the target server resource to the user, for creating the target container group.

In a third aspect, embodiments of the present disclosure provide an electronic device, comprising: one or more processors; and a memory, storing one or more programs, wherein the one or more programs, when executed by the one or more processors, cause the one or more processors to implement the method for allocating a server resource provided by the first aspect.

In a forth aspect, embodiments of the present disclosure provide a computer-readable medium, storing a computer program thereon, wherein the program, when executed by a processor, causes the processor to implement the method for allocating a server resource provided by the first aspect.

According to the method and apparatus for allocating a server resource, the electronic device and the computer readable storage medium provided in the embodiments of the present disclosure, the container group creation request initiated by the user for creating the target container group is first acquired. Then, the required amount of the server resources and the remaining amount of the server resources of the user are determined according to the container group creation request, the remaining amount comprising at least one of the exclusive server resource or the shared server resource. Next, the quality rating is performed on the each server resource in the remaining amount, and the target server resource corresponding to the required amount is selected according to the obtained actual rating. Finally, the target server resource is allocated to the user for creating the target container group.

Different from the existing technology in which the utilization rate of the server resource is low due to the scheme of the small cluster, in the embodiments of the present disclosure, all the server resources are divided into the exclusive server resource that may only be exclusive to some specific tenants and the shared server resource that may be used by all tenants. When a certain tenant has an exclusive server resource and a target container group created by the tenant requires the exclusive server resource, the exclusive server in the remaining amount may be directly allocated to create the target container group. Through the simple classification setting, the needs of different tenants may be flexibly met in a complete large cluster, thereby improving the utilization rate of the server resource and reducing the cost.

It should be understood that the content described in this part is not intended to identify key or important features of the embodiments of the present disclosure, and is not used to limit the scope of embodiments of the present disclosure.

Other features of embodiments of the present disclosure will be easily understood through the following description.

BRIEF DESCRIPTION OF THE DRAWINGS

After reading detailed descriptions for non-limiting embodiments given with reference to the following accompanying drawings, other features, objectives and advantages of embodiments of the present disclosure will be more apparent.

DETAILED DESCRIPTION OF EMBODIMENTS

The present disclosure is further described below in detail by combining the accompanying drawings and the embodiments. It may be appreciated that the specific embodiments described herein are merely used for explaining the relevant invention, rather than limiting the invention. In addition, it should also be noted that, for ease of description, only parts related to the relevant invention are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
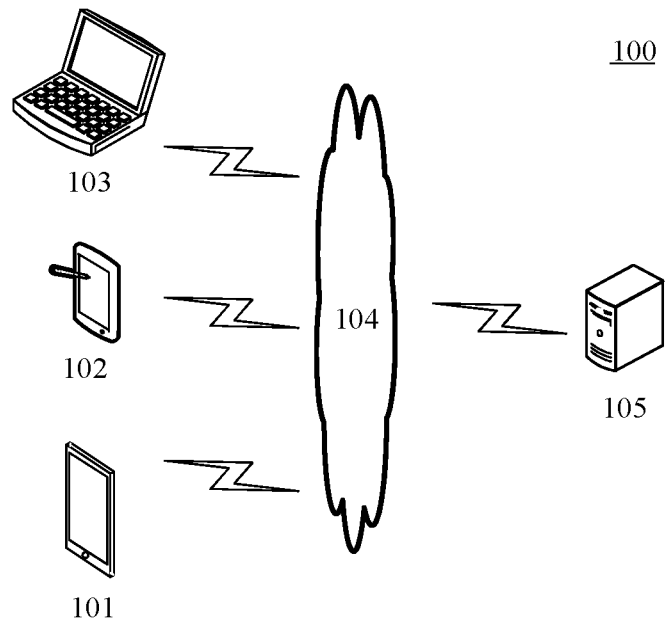
FIG. 1 is an exemplary system architecture in which embodiments of the present disclosure may be applied.

FIG. 1 illustrates an exemplary system architecture 100 in which an embodiment of a method and apparatus for allocating a server resource, an electronic device and a computer readable storage medium according to embodiments of the present disclosure may be applied.

As shown in FIG. 1, the system architecture 100 may comprise terminal devices 101, 102 and 103, a network 104, and a server 105. The network 104 serves as a medium providing a communication link between the terminal devices 101, 102 and 103 and the server 105. The network 104 may comprise various types of connections, for example, wired or wireless communication links, or optical fiber cables.

A user may use the terminal devices 101, 102 and 103 to interact with the server 105 via the network 104 to receive or send messages. Various applications for implementing an information communication between the terminal devices and the server (e.g., a data transmission application, a container group creation application and an instant communication application) may be installed on the terminal devices 101, 102 and 103 and the server 105.

The terminal devices 101, 102 and 103 and the server 105 may be hardware or software. When being the hardware, the terminal devices 101, 102 and 103 may be various electronic devices having a display screen, which comprise, but not limited to, a smart phone, a tablet computer, a laptop portable computer, a desktop computer, etc. When being the software, the terminal devices 101, 102 and 103 may be installed in the above listed electronic devices. The terminal devices may be implemented as a plurality of pieces of software or a plurality of software modules, or as a single piece of software or a single software module, which will not be specifically defined here. When being the hardware, the server 105 may be implemented as a distributed server cluster composed of a plurality of servers, or as a single server. When being the software, the server may be implemented as a plurality of pieces of software or a plurality of software modules, or as a single piece of software or a single software module, which will not be specifically defined here.

The server 105 may provide various services through various built-in applications. Taking a container group creation application that may provide a container group creation service as an example, the server 105, when running the container group creation application, may implement the following effects. First, via the network 104, the server 105 receives a container group creation request initiated through the terminal devices 101, 102 and 103 by the user for creating a target container group. Then, the server 105 determines an amount of server resources required by the user and a remaining amount of the server resources according to the container group creation request, the remaining amount comprising at least one of an exclusive server resource or a shared server resource. Next, the server 105 rates qualities of the intra-city server resources, and selects a target server resource corresponding to the required amount according to an obtained actual rating. Finally, the server 105 allocates the target server resource to the user for creating the target container group. That is, the server 105 selects an appropriate server resource for the user through the above processing steps, to create the target container group of the user. Further, the server 105 may also return the target server resource to the terminal devices 101, 102 and 103 to inform the user initiating the request.

Since the creation of the container group is generally implemented on a cloud platform, the method for allocating a server resource provided in subsequent embodiments of the present disclosure is generally performed by the server 105 for constructing the cloud platform. Correspondingly, the apparatus for allocating a server resource is also provided in the server 105.

It should be appreciated that the numbers of the terminal devices, the networks, and the servers in FIG. 1 are merely illustrative. Any number of terminal devices, networks, and servers may be provided based on actual requirements.

Figure 2:
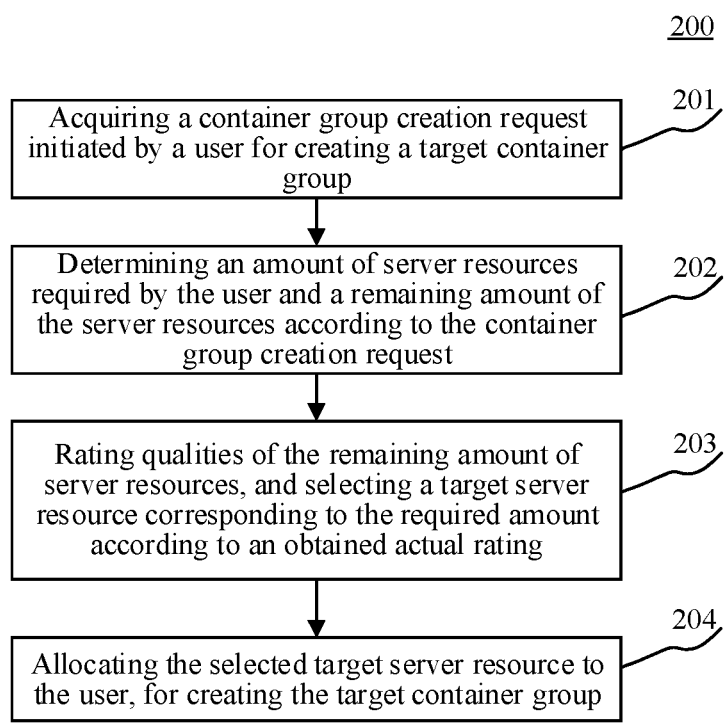
FIG. 2 is a flowchart of a method for allocating a server resource, provided in an embodiment of the present disclosure.

Further referring to FIG. 2, FIG. 2 is a flowchart of a method for allocating a server resource, provided in an embodiment of the present disclosure. Here, the flow 200 comprises the following steps.

Step 201, acquiring a container group creation request initiated by a user for creating a target container group.

This step is intended to acquire, by an executing body (e.g., the server 105 shown in FIG. 1) of the method for allocating a server resource, the container group creation request. Here, the container group creation request is initiated by the user (a tenant) to the above executing body based on an actual business need (e.g., initiated to the server 105 using the terminal devices 101, 102 and 103 shown in FIG. 1 via the network 104), and the container group creation request represents that the user is required to create the target container group under a Kubernetes to run the business of the user.

In addition to being received from the user in real time, the container group creation request may be acquired from a local data storage module of the above executing body, for example, a container group creation request that is previously retained and not completely processed. Further, a plurality of received container group creation requests may be arranged in a preset scheduling waiting queue, to wait, in a certain order (e.g., a first-in first-out order, and a priority-based order), to be processed sequentially by a processing module in the above executing body.

The container group creation request may comprise a variety of information related to the creation of the target container group, for example, whether splitting is supported, whether a server at a specific location is specified for the creation, a user recognition identifier of the user (for recognizing the identity of the user), whether it is required to use an exclusive server resource, a total demand of a server resource, a service group of a business that is to be run, a type of the business that is to be run, and location information of the user, such that the above executing body better selects a server resource suitable for the user and required by the user, according to the information comprised in the container group creation request.

Step 202, determining an amount of server resources required by the user and a remaining amount of the server resources according to the container group creation request.

On the basis of step 201, this step is intended to determine, by the above executing body, two parameters according to the container group creation request, that is, the required amount of the server resources for creating the target container group and the remaining amount of the server resources that may be used under the current cloud platform by the user initiating the creation request.

Here, the required amount is generally specified according to an actual need by the user initiating the container group creation request. Therefore, the required amount is generally comprised in a certain field of the container group creation request, for example, a demand information field. The remaining amount refers to all server resources available to the user in the current cloud platform. It should be specifically noted that, unlike a conventional cloud platform where there is only a shared server resource available to all tenants, the remaining amount of each user in embodiments of the present disclosure is constituted based on at least one of the exclusive server resource and the shared server resource corresponding to the user. For example, tenant A pre-purchases the exclusive use right of 10 servers on a cloud platform. In the situation where the tenant A does not use any server resource, the remaining amount of the tenant A is the sum of the amounts of the resources that may be provided by the 10 exclusive servers and the current shared server. If tenant B does not purchase the exclusive use right of a server on the cloud platform, the remaining amount of the tenant B is the amount of the resources that may be provided by the current shared server, in the situation where the tenant B does not use any server resource.

Simply speaking, according to embodiments of the present disclosure, all servers are pre-divided, according to users, into an exclusive server exclusive to some users and a shared server available to all users, such that when a user owning an exclusive server offers to use the exclusive server resource owned by the user through the container group creation request to create the target container group, the exclusive server resource owned by the user may be directly allocated to create the target container group, thereby meeting the needs of the user.

Step 203, rating qualities of the remaining amount of server resources, and selecting a target server resource corresponding to the required amount according to an obtained actual rating.

This step is intended to rate, by the above executing body, qualities of the remaining amount of server resources, and to select the target server resource corresponding to the required amount according to the obtained actual rating.

Here, the quality rating may comprise at least one of the following quality rating factors: a remaining amount of resources, a number of resource fragments, an affinity with a container group having a preset requirement, whether a local mirror image is present, and an affinity of an exclusive server resource. The more the remaining amount of the resource is, the higher the rating generally is. The less the amount of the resource fragments is, the higher the rating generally is. The higher the affinity with the container group is, the higher the rating generally is. The local mirror image where read-and-write operations may remain would increase the rating. When the target container group requires the use of the exclusive server to perform the creation, the higher the affinity of the exclusive server resource is, the higher the rating generally is. In the situation where a plurality of quality rating factors are used at the same time, the scores of the plurality of quality rating factors may be synthesized through a weighted calculation method.

Further, in the situation where the number of servers constituting the cloud platform is large, in order to improve the efficiency, the range of servers on which the quality rating needs to performed may also be reduced in many ways. For example, a server that may provide an amount of resources exceeding a preset proportion of the required amount (e.g., 10%, 15% and 20%) is randomly selected from all the candidate servers of the remaining amount, to participate in the quality rating. It is also possible to feed back, in the form of a plurality of randomly constituted logical queues, all the candidate servers to the user initiating the container group creation request, to determine the target logical queues based on the selection information returned by the user, and to rate only the qualities of the remaining amount of server resources constituting the target logical queue. In the selection, parameters such as a location and a special requirement required by the target container group may also be added to further perform screening.

Step 204, allocating the target server resource to the user, for creating the target container group.

On the basis of step 203, this step is intended to allocate, by the above executing body, the target server resource to the user for creating the target container group, and finally complete the creation of the target container group.

Different from the existing technology in which the utilization rate of the server resource is low due to the scheme of the small cluster, according to the method for allocating a server resource provided in the embodiment of the present disclosure, all the server resources are divided into the exclusive server resource that may only be exclusive to some specific tenants and the shared server resource that may be used by all tenants. When a certain tenant owns an exclusive server resource and the target container group created by the tenant requires the exclusive server resource, the exclusive server in the remaining amount may be directly allocated to create the target container group. Through the simple classification setting, the needs of different tenants may be flexibly met in a complete large cluster, thereby improving the utilization rate of the server resource and reducing the cost.

Figure 3:
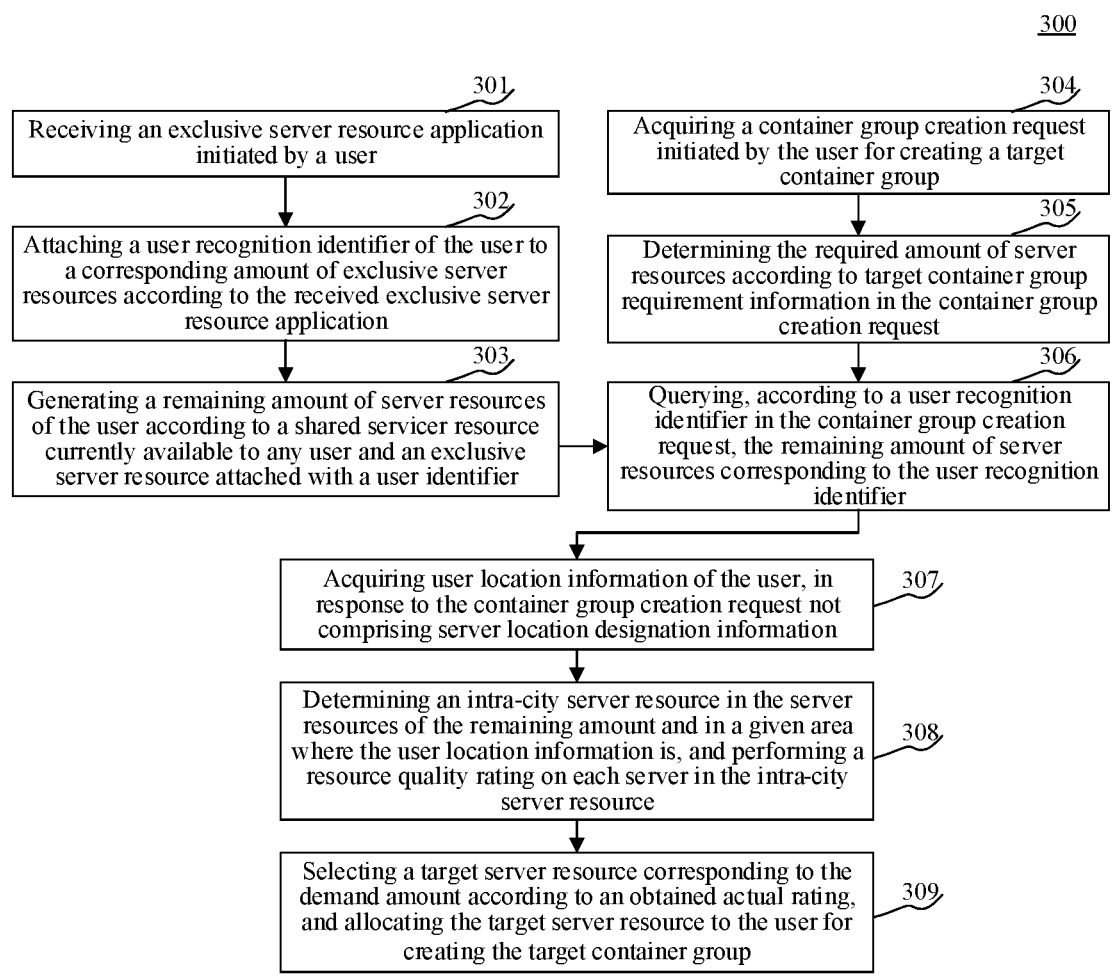
FIG. 3 is a flowchart of another method for allocating a server resource, provided in an embodiment of the present disclosure.

Referring to FIG. 3, FIG. 3 is a flowchart of another method for allocating a server resource provided in an embodiment of the present disclosure. Here, the flow 300 comprises the following steps.

Step 301, receiving an exclusive server resource application initiated by a user.

This step is intended to receive, by the above executing body, the exclusive server resource application initiated by the user. The exclusive server resource application represents that the user wants to apply for some server resources in a cloud platform as server resources exclusive to the user himself. Specifically, the exclusive server resource application may comprise a plurality of parameters such as a type of an exclusive server, an amount of resources, and usage time.

Step 302, attaching a user recognition identifier of the user to a corresponding amount of exclusive server resources according to the exclusive server resource application.

On the basis of step 301, this step is intended to attach, by the above executing body, the user recognition identifier of the user to the corresponding amount of exclusive server resources according to the exclusive server resource application, to mark a corresponding server resource as belonging to a server resource exclusive to the corresponding user by attaching the user recognition identifier. Here, the user recognition identifier should be unique, that is, may uniquely determine a user, and may comprise, but not limited to, a feature code, a user unique number, and the like.

Step 303, generating a remaining amount of server resources of the user according to a shared server resource currently available to any user and an exclusive server resource attached with a user recognition identifier.

This step is intended to establish, by the above executing body, a corresponding relationship between a user recognition identifier and a corresponding remaining amount for a subsequent query. Here, the remaining amount is determined according to the shared server resource currently available to any user and the exclusive server resource attached with the user recognition identifier, and is generally the sum of the shared server resource and the exclusive server resource.

Step 304, acquiring a container group creation request initiated by the user for creating a target container group.

This step is consistent with step 201 shown in FIG. 2. For the same content, reference is made to the corresponding part of the previous embodiment, which will not be repeatedly described here.

Step 305, determining an amount of server resources required by the user according to target container group demand information in the container group creation request.

This step is intended to determine, by the above executing body, the required amount according to the target container group demand information in the container group creation request, the target container group demand information being used for recording the required amount.

Step 306, querying, according to a user recognition identifier comprised in the container group creation request, a remaining amount of server resources corresponding to the user recognition identifier.

On the basis of step 303, this step is intended to query, by the above executing body, the remaining amount corresponding to the user according to the user recognition identifier.

Step 307, acquiring user location information of the user, in response to the container group creation request not comprising server location designation information.

Here, the server location designation information represents the location where the server that should be used for creating the target container group is located. When the information is not comprised, it indicates that the target container group created by the user does not limit the user to use which server resource.

Step 308, determining an intra-city server resource in the server resources of the remaining amount and in a given area where the user location information is, and rating qualities of the remaining amount of server resources in the intra-city server resource.

On the basis of step 307, this step is intended to select, by the above executing body, the intra-city server resource in the given area where the user location information is based on the user location information, such that a business running in the target container group may be conveyed as far as possible to the user through a closer physical distance.

Step 309, selecting a target server resource corresponding to the required amount according to an obtained actual rating, and allocating the target server resource to the user for creating the target container group.

On the basis of having all the beneficial effects of the previous embodiment, this embodiment provides a scheme of how the user owns the exclusive server resource through steps 301-303. That is, the exclusive server resource application is initiated to the above executing body. In the situation where the above executing body confirms that the application may be passed, the exclusive server resource is marked using the user recognition identifier of the user, so as to clarify that the user owns the exclusive use right of the marked server resource. Through steps 305 and 306, the required amount the remaining amount are correspondingly determined according to two parts of information comprised in the container group creation request, respectively. Through steps 307-309, a scheme of determining the target server resource in the remaining amount and in the intra-city server belonging to the given area where the user is located is provided, such that the business running in the target container group may be conveyed as far as possible to the user through the closer physical distance, thereby improving the use experience of the user.

On the basis of any of the above embodiments, the overall rating of the shared server resource and the exclusive server resource may also be adjusted according to whether the target container group needs to be created through the exclusive server resource held by the user, so as to select a more appropriate target server from the remaining amount through the adjustment for the rating.

An implementation may comprise, but not limited to the following steps:

A rating of the shared server resource in the remaining amount is raised in response to the container group creation request not comprising a server exclusive requirement mark. That is, when the target container group does not need a server resource of a particularly high requirement, the target server resource is selected as lower cost as possible from the shared server, thereby reducing the cost.

A rating of the exclusive server resource in the remaining amount is raised in response to the container group creation request comprising the server exclusive requirement mark. That is, when the target container group needs a server resource of a high requirement, the target server resource is selected as higher performance as possible from the exclusive server resource, thus avoiding the interference caused by resource sharing, and improving the performance.

That is, when there is the server exclusive demand, the target server resource is selected from the exclusive server resource by overall raising the rating of the exclusive server resource, thereby improving the performance. When there is no server exclusive demand, the target server resource is selected from the shared server resource by raising the rating of the shared server resource, thereby reducing the cost as much as possible.

On the basis of any of the above embodiments, an implementation in which a server resource on which the quality rating needs to be performed is screened through a logical queue list is further provided here.

A candidate logical queue list is returned to the user according to the container group creation request. Here, the logical queue list comprises a plurality of logical queues, each logical queue is constituted based on at least one of an exclusive physical server queue or a shared physical server queue, the exclusive physical server queue comprises at least one exclusive physical server, and the shared physical server queue comprises at least one shared physical server.

A target logical queue sent by the user according to the candidate logical queue list is received. Correspondingly, this step is correspondingly changed to: rating qualities of the remaining amount of server resources constituting the target logical queue.

Figure 4:
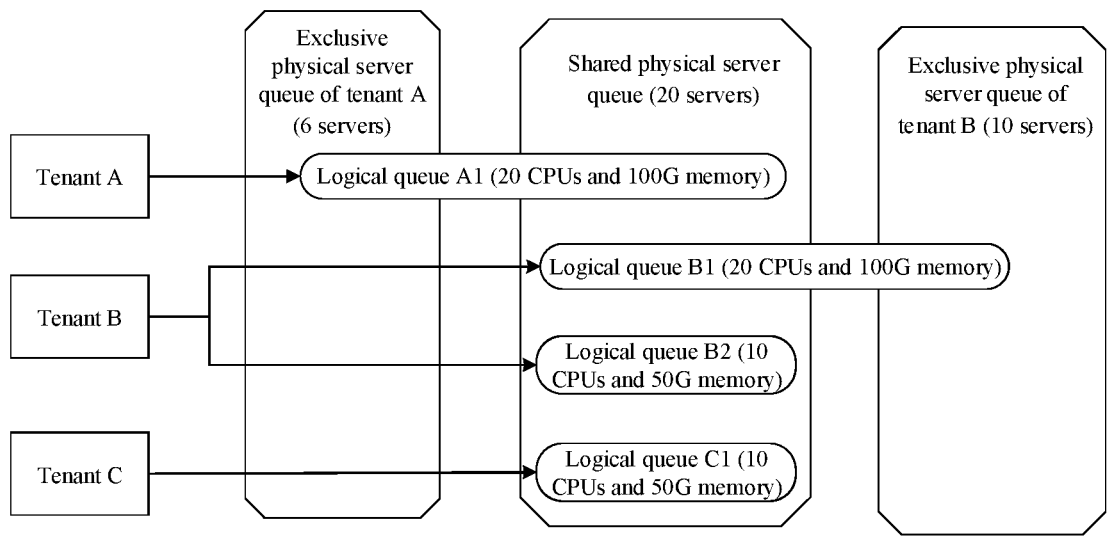
FIG. 4 is a schematic diagram of a logical queue between different tenants, provided in an embodiment of the present disclosure.

Referring to the schematic diagram as shown in FIG. 4, in FIG. 4, tenant B has two logical queues B1 and B2. Here, the logical queue B2 is bound to a shared physical server queue, that is, a container group in the queue may only be scheduled to a server in the shared physical server queue, and the tenant B needs to share a resource with tenant A and tenant C. The logical queue B1 is bound to the shared physical server queue and the exclusive physical server queue of the tenant B at the same time. That is, a container group in the queue may be scheduled to the servers of the two queues at the same time. The logical queue A1 owned by the tenant A is similar to the logical queue B2, and the logical queue C1 owned by the tenant C is similar to the logical queue B1. It may also be seen that each logical queue in FIG. 4 owns a set resource requirement upper limit, so as to find an appropriate server queue as required.

Figure 5:
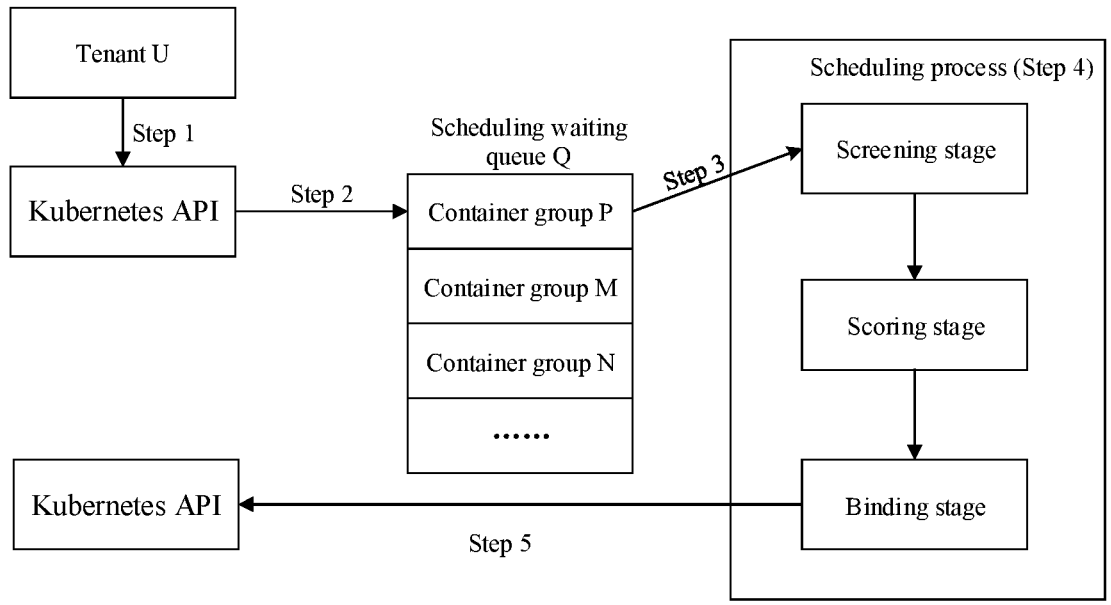
FIG. 5 is a schematic flowchart of an allocation of a server resource required by a creation of a container group P to a tenant U in an application scenario, provided in an embodiment of the present disclosure.

For a deeper understanding, embodiments of the present disclosure further provides a specific implementation in combination with a specific application scenario. Reference is made to the schematic flowchart as shown in FIG. 5.

It is assumed that the scenario is: the tenant U is to create a container group P that is required to monopolize the service resources of 10 CPUs and 100 G memory. The entire implementation process may be split into the following five steps:

Step 1: The tenant U sends a request for a creation of the container group P to a Kubernetes system through an API (Application Programming Interface) of the Kubernetes.

The request content of the request comprises a tenant identity, an applied-for logical queue L, a resource demand, a server tag requirement, priority information, and the like.

Step 2: The Kubernetes puts the container group P into a scheduling waiting queue Q, and the scheduling waiting queue Q adjusts the ranking of the container group P in the entire queue according to the priority information.

Step 3: A scheduling main loop under the control of the Kubernetes continuously fetches, from the scheduling waiting queue Q, the container group creation request ranking first, and performs one scheduling process. Here, it is assumed that the container group P initiated by the tenant U has the highest priority.

Step 4: Taking the container group P as an example, a scheduling process is performed.

a) Screening stage: At this stage, it is required to screen, from a server of a physical queue bound to the logical queue L applied for by the container group P, a server in which the container group P is allowed to be scheduled without considering a resource.

Screening factors comprise a server failure, a server tag not meeting a requirement of P, etc. In order to improve the scheduling efficiency, it is not necessary to screen all the optional servers, but a certain proportion of candidate servers are screened out according to a preset sampling proportion (e.g., 10%).

b) Scoring stage: At this stage, it is required to perform scoring on all the servers screened out in the previous step. There are many factors affecting the scoring. The related factors mainly comprise a queue affinity, a resource capacity, etc., and the server with a highest score that meets the need of the container P is then obtained.

c) Binding stage: The container group P and the server with the highest score are bound, and if the binding fails, the container is added to the waiting queue Q again.

Step 5: After the binding of the container group P and the server with the highest score is completed, the bound server starts the creation operation corresponding to the container group P locally and performs the task therein.

Figure 6:
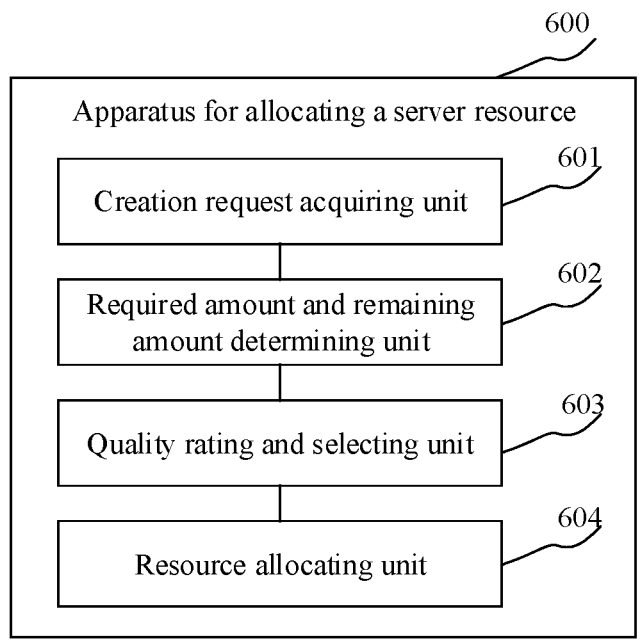
FIG. 6 is a structure block diagram of an apparatus for allocating a server resource, provided in an embodiment of the present disclosure.

Further referring to FIG. 6, as an implementation of the method shown in the above drawings, embodiments of the present disclosure provides an embodiment of an apparatus for allocating a server resource. The embodiment of the apparatus corresponds to the embodiment of the method shown in FIG. 2, and the apparatus may be specifically applied to various electronic devices.

As shown in FIG. 6, the apparatus 600 for allocating a server resource in this embodiment may comprise: a creation request acquiring unit 601, a required amount and remaining amount determining unit 602, a quality rating and selecting unit 603 and a resource allocating unit 604. Here, the creation request acquiring unit 601 is configured to acquire a container group creation request initiated by a user for creating a target container group. The required amount and remaining amount determining unit 602 is configured to determine an amount of server resources required by the user and a remaining amount of the server resources according to the container group creation request, the remaining amount comprising at least one of an exclusive server resource or a shared server resource. The quality rating and selecting unit 603 is configured to rate qualities of the remaining amount of server resources in the remaining amount, and select a target server resource corresponding to the required amount according to an obtained actual rating. The resource allocating unit 604 is configured to allocate the target server resource to the user, for creating the target container group.

In this embodiment, for specific processes of the creation request acquiring unit 601, the required amount and remaining amount determining unit 602, the quality rating and selecting unit 603 and the resource allocating unit 604 in the apparatus 600 for allocating a server resource, and their technical effects, reference may be made to relative descriptions of steps 201-204 in the corresponding embodiment of FIG. 2 respectively, which will not be repeatedly described here.

In some alternative implementations of this embodiment, the apparatus 600 for allocating a server resource may further comprise: an exclusive resource application receiving unit, configured to receive an exclusive server resource application initiated by the user; a user recognition identifier attaching unit, configured to attach a user recognition identifier of the user to a corresponding amount of exclusive server resources according to the exclusive server resource application; and a server resource remaining amount generating unit, configured to generate the remaining amount of the server resources of the user according to a shared server resource currently available to any user and an exclusive server resource attached with the user recognition identifier.

In some alternative implementations of this embodiment, the quality rating and selecting unit 603 comprises a quality rating subunit. The quality rating subunit may be further configured to: determine the required amount of the server resources according to target container group demand information in the container group creation request; and query, according to a user recognition identifier comprised in the container group creation request, a remaining amount of server resources corresponding to the user recognition identifier.

In some alternative implementations of this embodiment, the apparatus 600 for allocating a server resource may further comprise: a first rating adjusting unit, configured to raise a rating of the shared server resource in the remaining amount, in response to the container group creation request not comprising a server exclusive requirement mark; and a second rating adjusting unit, configured to raise a rating of the exclusive server resource in the remaining amount, in response to the container group creation request comprising the server exclusive requirement mark.

In some alternative implementations of this embodiment, the quality rating and selecting unit 603 comprises the quality rating subunit. The quality rating subunit may be further configured to: acquire user location information of the user, in response to the container group creation request not comprising server location designation information; and determine an intra-city server resource in the server resources of the remaining amount and in a given area where the user location information is, and rate qualities of the remaining amount of server resources in the intra-city server resource.

In some alternative implementations of this embodiment, the apparatus 600 for allocating a server resource may further comprise: a candidate logical queue list returning unit, configured to return a candidate logical queue list to the user according to the container group creation request, wherein the logical queue list comprises a plurality of logical queues, each logical queue is constituted based on at least one of an exclusive physical server queue or a shared physical server queue, the exclusive physical server queue comprises at least one exclusive physical server, and the shared physical server queue comprises at least one shared physical server; and a target logical queue receiving unit, configured to receive a target logical queue sent by the user according to the candidate logical queue list. The quality rating subunit comprised in the quality rating and selecting unit 603 may be further configured to: rate qualities of the remaining amount of server resources constituting the target logical queue.

In some alternative implementations of this embodiment, the quality rating comprises at least one of following quality rating factors: a remaining amount of resources, a number of resource fragments, an affinity with a container group having a preset requirement, whether a local mirror image is present, and an affinity of an exclusive server resource.

This embodiment exists as the embodiment of the apparatus corresponding to the above embodiment of the method shown. Different from the existing technology in which the utilization rate of the server resource is low due to the scheme of the small cluster, according to the apparatus for allocating a server resource provided in the embodiment of the present disclosure, all the server resources are divided into the exclusive server resource that may only be exclusive to some specific tenants and the shared server resource that may be used by all tenants. When a certain tenant owns an exclusive server resource and the target container group created by the tenant requires the exclusive server resource, the exclusive server in the remaining amount may be directly allocated to create the target container group. Through the simple classification setting, the needs of different tenants may be flexibly met in a complete large cluster, thereby improving the utilization rate of the server resource and reducing the cost.

According to an embodiment of the present disclosure, embodiments of the present disclosure further provides an electronic device and a computer readable storage medium.

Figure 7:
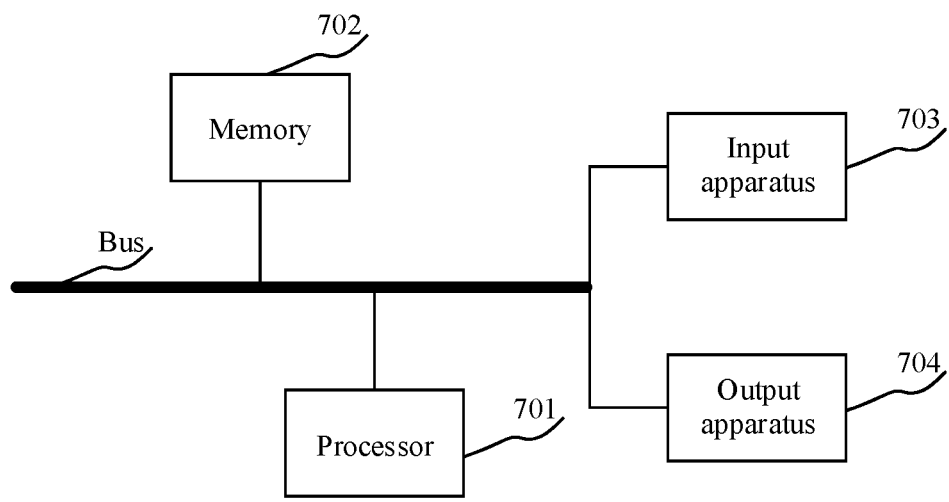
FIG. 7 is a schematic structural diagram of an electronic device adapted to perform a method for allocating a server resource, provided in embodiments of the present disclosure.

FIG. 7 is a block diagram of an electronic device adapted to implement a method for allocating a server resource according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of embodiments of the present disclosure described and/or claimed herein.

As shown in FIG. 7, the electronic device comprises: one or more processors 701, a memory 702, and interfaces for connecting various components, comprising high-speed interfaces and low-speed interfaces. The various components are connected to each other using different buses, and may be installed on a common motherboard or in other methods as needed. The processor may process instructions executed within the electronic device, comprising instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 7, one processor 701 is used as an example.

The memory 702 is a non-transitory computer readable storage medium provided by embodiments of the present disclosure. The memory stores instructions executable by at least one processor, so that the at least one processor performs the method for allocating a server resource provided by embodiments of the present disclosure. The non-transitory computer readable storage medium of embodiments of the present disclosure stores computer instructions for causing a computer to perform the method for allocating a server resource provided by embodiments of the present disclosure.

The memory 702, as a non-transitory computer readable storage medium, may be used to store non-transitory software programs, non-transitory computer executable programs and modules, such as program instructions/modules corresponding to the method for allocating a server resource in the embodiments of the present disclosure (for example, the creation request acquiring unit 601, the required amount and remaining amount determining unit 602, the quality rating and selecting unit 603, and the resource allocating unit 604 shown in FIG. 6). The processor 701 executes the non-transitory software programs, instructions, and modules stored in the memory 702 to execute various functional applications and data processing of the server, that is, to implement the method for allocating a server resource in the foregoing method embodiment.

The memory 702 may comprise a storage program area and a storage data area, where the storage program area may store an operating system and at least one function required application program; and the storage data area may store kinds of data created by the electronic device when executing the method for allocating a server resource, etc. In addition, the memory 702 may comprise a high-speed random access memory, and may also comprise a non-transitory memory, such as at least one magnetic disk storage device, a flash memory device, or other non-transitory solid-state storage devices. In some embodiments, the memory 702 may optionally comprise memories remotely provided with respect to the processor 701, and these remote memories may be connected to the electronic device adapted to execute the method for allocating a server resource through a network. Examples of the above network comprise but are not limited to the Internet, intranet, local area network, mobile communication network, and combinations thereof.

The electronic device adapted to execute the method for allocating a server resource may further comprise: an input apparatus 703 and an output apparatus 704. The processor 701, the memory 702, the input apparatus 703, and the output apparatus 704 may be connected through a bus or in other methods. In FIG. 7, connection through a bus is used as an example.

The input apparatus 703 may receive input digital or character information, and generate key signal inputs related to user settings and function control of the electronic device adapted to execute the method for allocating a server resource, such as touch screen, keypad, mouse, trackpad, touchpad, pointing stick, one or more mouse buttons, trackball, joystick and other input apparatuses. The output apparatus 704 may comprise a display device, an auxiliary lighting apparatus (for example, LED), a tactile feedback apparatus (for example, a vibration motor), and the like. The display device may comprise, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may comprise: being implemented in one or more computer programs that may be executed and/or interpreted on a programmable system that comprises at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) comprise machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, comprising machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (comprising acoustic input, voice input, or tactile input) may be used to receive input from the user.

The systems and technologies described herein may be implemented in a computing system that comprises backend components (e.g., as a data server), or a computing system that comprises middleware components (e.g., application server), or a computing system that comprises frontend components (for example, a user computer having a graphical user interface or a web browser, through which the user may interact with the implementations of the systems and the technologies described herein), or a computing system that comprises any combination of such backend components, middleware components, or frontend components. The components of the system may be interconnected by any form or medium of digital data communication (e.g., communication network). Examples of the communication network comprise: local area networks (LAN), wide area networks (WAN), the Internet, and blockchain networks.

The computer system may comprise a client and a server. The client and the server are generally far from each other and usually interact through the communication network. The relationship between the client and the server is generated by computer programs that run on the corresponding computer and have a client-server relationship with each other.

Different from the existing technology in which the utilization rate of the server resource is low due to the scheme of the small cluster, in the embodiments of the present disclosure, all the server resources are divided into the exclusive server resource that may only be exclusive to some specific tenants and the shared server resource that may be used by all tenants. When a certain tenant has an exclusive server resource and a target container group created by the tenant requires the exclusive server resource, the exclusive server in the remaining amount may be directly allocated to create the target container group. Through the simple classification setting, the needs of different tenants may be flexibly met in a complete large cluster, thereby improving the utilization rate of the server resource and reducing the cost.

It should be understood that the various forms of processes shown above may be used to reorder, add, or delete steps. For example, the steps described in embodiments of the present disclosure may be performed in parallel, sequentially, or in different orders. As long as the desired results of the technical solution disclosed in embodiments of the present disclosure may be achieved, no limitation is made herein.

The above specific embodiments do not constitute limitation on the protection scope of embodiments of the present disclosure. Those skilled in the art should understand that various modifications, combinations, sub-combinations and substitutions may be made according to design requirements and other factors. Any modification, equivalent replacement and improvement made within the spirit and principle of embodiments of the present disclosure shall be comprised in the protection scope of embodiments of the present disclosure.

What is claimed is:

1. A method for allocating a server resource, comprising:
    acquiring a container group creation request initiated by a user for creating a target container group;
    determining a required amount of server resources required by the user and a remaining amount of the server resources according to the container group creation request, the remaining amount comprising at least one of an exclusive server resource or a shared server resource;
    rating qualities of the remaining amount of server resources, and selecting a target server resource corresponding to the required amount according to an obtained actual rating; and
    allocating the selected target server resource to the user for creating the target container group;
    wherein the method further comprises:
    receiving an exclusive server resource application initiated by the user;
    attaching a user recognition identifier of the user to a corresponding amount of exclusive server resources according to the received exclusive server resource application; and
    generating the remaining amount of the server resources of the user according to a shared server resource currently available to any user and an exclusive server resource attached with the user recognition identifier.

2. The method according to claim 1, wherein the determining comprises:
    determining the required amount of the server resources according to target container group requirement information in the container group creation request; and
    querying, according to the user recognition identifier in the container group creation request, the remaining amount of server resources corresponding to the user recognition identifier.

3. The method according to claim 1, further comprising:
    raising a rating of the shared server resource in the remaining amount of server resources, in response to the container group creation request not having a server exclusive requirement mark; and
    raising a rating of the exclusive server resource in the remaining amount of server resources, in response to the container group creation request comprising the server exclusive requirement mark.

4. The method according to claim 1, wherein the rating comprises
    acquiring user location information of the user, in response to the container group creation request not having server location designation information; and
    determining intra-city server resources in the remaining amount of server resources and in a given area where the user location information is, and rating qualities of the intra-city server resources.

5. The method according to claim 1, further comprising:
    returning a candidate logical queue list to the user according to the container group creation request, wherein the logical queue list comprises a plurality of logical queues, wherein each logical queue is constituted based on at least one of an exclusive physical server queue or a shared physical server queue, the exclusive physical server queue comprises at least one exclusive physical server, and the shared physical server queue comprises at least one shared physical server; and
    receiving a target logical queue sent by the user according to the candidate logical queue list, and
    wherein the rating the qualities comprises:
    rating the qualities of each server resource constituting the target logical queue.

6. The method according to claim 1, wherein the rating is formed based on following factors:
    a remaining amount of resources, a number of resource fragments, an affinity with a container group having a preset requirement, whether a local mirror image is present, and an affinity of an exclusive server resource.

7. An electronic device, comprising:
    at least one processor; and
    a memory, communicated with the at least one processor,
    wherein the memory stores an instruction executable by the at least one processor, and the instruction is executed by the at least one processor, to enable the at least one processor to perform an operation for allocating a server resource, comprising:
    acquiring a container group creation request initiated by a user for creating a target container group;
    determining a required amount of server resources required by the user and a remaining amount of the server resources according to the container group creation request, the remaining amount comprising at least one of an exclusive server resource or a shared server resource;
    rating qualities of the remaining amount of server resources, and selecting a target server resource corresponding to the required amount according to an obtained actual rating; and
    allocating the selected target server resource to the user for creating the target container group;
    wherein the operation further comprises:
    raising a rating of the shared server resource in the remaining amount of server resources, in response to the container group creation request not having a server exclusive requirement mark; and
    raising a rating of the exclusive server resource in the remaining amount of server resources, in response to the container group creation request comprising the server exclusive requirement mark.

8. The device according to claim 7, further comprising:
    receiving an exclusive server resource application initiated by the user;

attaching a user recognition identifier of the user to a corresponding amount of exclusive server resources according to the received exclusive server resource application; and generating the remaining amount of the server resources of the user according to a shared server resource currently available to any user and an exclusive server resource attached with the user recognition identifier.

9. The device according to claim 8, wherein the determining comprises:

determining the required amount of the server resources according to target container group requirement information in the container group creation request; and querying, according to the user recognition identifier in the container group creation request, the remaining amount of server resources corresponding to the user recognition identifier.

10. The device according to claim 7, wherein the rating comprises acquiring user location information of the user, in response to the container group creation request not having server location designation information; and determining intra-city server resources in the remaining amount of server resources and in a given area where the user location information is, and rating qualities of the intra-city server resources.

11. The device according to claim 7, wherein the operation further comprises:

returning a candidate logical queue list to the user according to the container group creation request, wherein the logical queue list comprises a plurality of logical queues, wherein each logical queue is constituted based on at least one of an exclusive physical server queue or a shared physical server queue, the exclusive physical server queue comprises at least one exclusive physical server, and the shared physical server queue comprises at least one shared physical server; and receiving a target logical queue sent by the user according to the candidate logical queue list, and wherein the rating the qualities comprises:

rating the qualities of each server resource constituting the target logical queue.

12. A non-transitory computer readable storage medium, storing a computer instruction, wherein the computer instruction is used to cause a computer to perform an operation for allocating a server resource, comprising:

acquiring a container group creation request initiated by a user for creating a target container group;

determining a required amount of server resources required by the user and a remaining amount of the server resources according to the container group creation request, the remaining amount comprising at least one of an exclusive server resource or a shared server resource;

rating qualities of the remaining amount of server resources, and selecting a target server resource corresponding to the required amount according to an obtained actual rating; and allocating the selected target server resource to the user for creating the target container group;

wherein the rating is formed based on following factors:

a remaining amount of resources, a number of resource fragments, an affinity with a container group having a preset requirement whether a local mirror image is present and an affinity of an exclusive server resource.

13. The medium according to claim 12, further comprising:

receiving an exclusive server resource application initiated by the user;

attaching a user recognition identifier of the user to a corresponding amount of exclusive server resources according to the received exclusive server resource application; and generating the remaining amount of the server resources of the user according to a shared server resource currently available to any user and an exclusive server resource attached with the user recognition identifier.

14. The medium according to claim 13, wherein the determining comprises:

determining the required amount of the server resources according to target container group requirement information in the container group creation request; and querying, according to the user recognition identifier in the container group creation request, the remaining amount of server resources corresponding to the user recognition identifier.

15. The medium according to claim 12, wherein the operation further comprises:

raising a rating of the shared server resource in the remaining amount of server resources, in response to the container group creation request not having a server exclusive requirement mark; and raising a rating of the exclusive server resource in the remaining amount of server resources, in response to the container group creation request comprising the server exclusive requirement mark.

16. The medium according to claim 12, wherein the rating comprises acquiring user location information of the user, in response to the container group creation request not having server location designation information; and determining intra-city server resources in the remaining amount of server resources and in a given area where the user location information is, and rating qualities of the intra-city server resources.

17. The medium according to claim 12, wherein the operation further comprises:

returning a candidate logical queue list to the user according to the container group creation request, wherein the logical queue list comprises a plurality of logical queues, wherein each logical queue is constituted based on at least one of an exclusive physical server queue or a shared physical server queue, the exclusive physical server queue comprises at least one exclusive physical server, and the shared physical server queue comprises at least one shared physical server; and receiving a target logical queue sent by the user according to the candidate logical queue list, and wherein the rating the qualities comprises:

rating the qualities of each server resource constituting the target logical queue.

* * * * *